United States Patent [19]

Smith et al.

[11] Patent Number: 4,540,442
[45] Date of Patent: Sep. 10, 1985

[54] COMPOSITIONS AND METHODS FOR REMOVING SEALANT COMPOSITIONS

[75] Inventors: Timothy J. C. Smith, Colmar, Pa.; Jürgen Geke, Düsseldorf, Fed. Rep. of Germany; Robert Q. Cooper, Lansdale, Pa.

[73] Assignee: Amchem Products, Inc., Ambler, Pa.

[21] Appl. No.: 580,965

[22] Filed: Feb. 16, 1984

[51] Int. Cl.³ .................... C03C 23/00; B08B 7/00; C11D 9/30

[52] U.S. Cl. ........................... 134/2; 134/3; 134/38; 252/89.1; 252/524; 252/173; 252/117

[58] Field of Search ............... 134/3, 38, 41; 252/117, 252/89.1, 524, 529, 542, 548, 173

[56] References Cited

U.S. PATENT DOCUMENTS 3,337,471 8/1967 Levy et al. ................... 252/153
4,284,434 8/1981 Lingmann et al. ............ 252/117

FOREIGN PATENT DOCUMENTS 1143976 2/1969 United Kingdom.

*Primary Examiner*—Paul Lieberman
*Assistant Examiner*—John F. McNally
*Attorney, Agent, or Firm*—Ernest G. Szoke; Henry E. Millson, Jr.; Mark A. Greenfield

[57] ABSTRACT

Aqueous compositions containing as essential ingredients; an alkanolamine, an aliphatic carboxylic acid containing 5 to 18 carbon atoms, and an arylenetriazole have been found effective in removing resin-containing sealants from the surfaces of zinc containing metals, such as galvanized steel, without causing changes in the surfaces of the metal, so that phosphate coatings which are subsequently applied to said surfaces are neither streaky nor spotty.

25 Claims, No Drawings

COMPOSITIONS AND METHODS FOR REMOVING SEALANT COMPOSITIONS

This invention relates to the removal from metals of sealants used in the automotive and other fields. It particularly relates to compositions and methods for removing sealants and other extraneous materials such as oils, dust smudges and the like which are deposited or otherwise formed on automobile bodies.

BACKGROUND OF THE INVENTION

One of the most difficult problems in cleaning automotive bodies prior to the finishing steps leading to the application of automotive paint is in the removal of unwanted sealants commonly used in sealing and waterproofing joints and openings between metal parts. When such sealants are applied, usually by means of extrusion through grease guns, excess quantities of sealant are often inadvertently extruded or dripped onto the adjacent metal parts. Frequently, dust or other undesirable material settles on and adheres to this sealant. The excess sealant must be removed from the metal before the application of a conversion coating prior to painting.

The sealants commonly used in the automotive and allied industries are compositions containing a resin such as an epoxy resin or a vinyl resin, e.g. polyvinyl chloride resin; a heavy blending oil such as linseed oil, dioctylphthalate, diethylphthalate, dibutylphthalate, etc.; a fixotrope, e.g. CARBOSIL; and a filler such as calcium carbonate or limestone. Such sealants are of course water-insoluble, since their purpose and use as sealants is to seal and waterproof the joints and openings in which they are used. These sealants are also used in allied industries, such as the aviation industry, in the manufacture of trucks and buses, and in the manufacture of tractors and other motorized farm equipment.

One method for removing such unwanted sealants is by the use of kerosene. However, kerosene has many disadvantages, including toxicity to the workers using it on prolonged exposure; flammability problems; unpleasant odor; and the problem of removing excess kerosene from the metal parts, since kerosene has low water solubility and cannot be readily removed by use of a water rinse. In fact, when automotive bodies containing areas coated with kerosene are immersed or sprayed one after the other in a standard cleaning solution prior to the application of a conversion coating to the metal bodies, the bath becomes contaminated relatively rapidly and rendered ineffective by the kerosene, requiring frequent down time and expense in draining the kerosene-contaminated bath and making up a fresh bath. The use of emulsifiable kerosene was an improvement but did not satisfactorily eliminate the above problems. Hence, until commercially alternative means were developed for removing the sealant the use of kerosene had to be tolerated.

Aqueous detergent compositions have been developed to remove the undesirable sealant and these compositions are now replacing kerosene. Such compositions have been disclosed and claimed in copending application Ser. No. 379,108, filed May 17, 1982 to Plante et al. These detergent compositions are used as prewipe or precleaner to remove the undesirable sealant before the body is subjected to the sequential treatment prior to the application of a siccative coating. This sequential treatment comprises a cleaning step, a water rinse, application of a pre-coat (a phosphate coating), a water rinse, and drying. The pre-wipe or pre-cleaning with these detergent compositions not only removes the sealant, but also other undesirable materials and thus helps in preventing or delaying the contamination of the cleaner composition which is subsequently used.

These detergent compositions were found to be satisfactory in pre-treating automotive bodies which were constructed of steel. However, when the metal used in these bodies included sections of galvanized steel, problems appeared. This occurred, for example, when General Motors began the manufacture of the 1982 Citation hatch-back since this new hatch-back had an all ultra-smooth galvanized steel hatch-back lid; the rest of the body being formed of the type of steel previously used. Except for the hatch-back lid, very uniform precoats (i.e. phosphate coatings) were obtained on automobile bodies treated as described above; however, the phosphate coatings on the metal of the lid were streaky and covered with white spots. Good siccative coatings cannot be obtained on such streaky and spotted surfaces. Apparently, some component or components in these detergent compositions is reacting with the zinc in the galvanized steel thereby causing the undesirable streaking and spotting.

Accordingly, it is an object of this invention to provide a composition for the removal of undesired sealant from automobile bodies the use of which will not result in streaking or spotting on galvanized steel when a phosphate precoat is subsequently applied.

It is another object of this invention to provide a composition for the removal of undesired sealant from the surface of galvanized steel without affecting the surface of the steel.

Other objects will appear from the description which follows.

DESCRIPTION OF THE INVENTION

In accordance with this invention, there are provided compositions for the removal of sealant and other undesirable materials from the surfaces of galvanized steel and other zinc containing metals without affecting the surface of the metal so streaking or spotting does not occur when phosphate precoats are subsequently applied to the metal treated with said compositions. In addition, the compositions of the invention provide meaningful temporary corrosion protection. It should be noted that the present compositions can also be applied advantageously to the surfaces of metals other than zinc containing metals, for example, to ferrous metals, such as steel, and to aluminum. The compositions are aqueous solutions containing as essential ingredients an alkanolamine, an aliphatic carboxylic acid containing 5 to 18 carbon atoms, and an arylenetriazole; the amount of alkanolamine being at least sufficient to react with the carboxylic acid to form a water-soluble salt.

The compositions desirably contain in approximate percent by weight:

| Ingredient | % By Weight | Preferred % By Weight | Most Preferred % By Weight |
| --- | --- | --- | --- |
| an alkanolamine | 1–55 | 2–6 | 2.5–3.5 |
| an aliphatic carboxylic acid containing 5 to 18 carbon atoms | 0.9–40 | 1.5–3.0 | 2.0–2.5 |
| an arylenetriazole | 0.01–1.0 | 0.02–0.07 | 0.03–0.05 |

-continued

| Ingredient | % By Weight | Preferred % By Weight | Most Preferred % By Weight |
|---|---|---|---|
| surfactant | 0–15 | 0.3–5 | 0.6–1.5 |
| water | q.s. 100 | q.s. 100 | q.s. 100 |

The pH of these compositions range from about 7.5 to about 10.0, preferably from about 7.8 to about 8.5.

The alkanolamine can be a mono-, di-, or trialkanolamine or mixtures thereof. Preferably, the alkanol group or groups therein each contain from 1 to 5 carbon atoms. Triethanolamine is most preferred. Triethanolamine is usually added in the form of commercial product containing 85% triethanolamine and the balance diethanolamine.

The aliphatic carboxylic acids include saturated and unsaturated acids which can be straight chained or branched. Such acids include valeric acid, isovaleric acid, angelic acid, tiglic acid, caproic acid, t-butylacetic acid, heptanoic acid, 2-ethyl-hexanoic acid, 4-ethyl-hexanoic acid, caprylic acid, valproic acid, pelargonic acid, isononanoic acid, and the like. Also included within the scope of the invention are mixtures of two or more such acids.

The surfactant can be anionic, cationic or nonionic. Mixtures of two or more surfactants can be used, except that mixtures of anionic and cationic surfactants should not be used. Suitable surfactants include:

POLY-TERGENT S-205LF (Olin Mathieson Company), a polyoxyethylene-polyoxypropylene alcohol;

TRITON DF-16 (Rohm & Haas Co.) a nonionic surfactant which is a modified polyethoxylated straight chain alcohol;

POLY-TERGENT S-505LF (Olin Corp.) a nonionic surfactant which is a modified polyethoxylated straight chain alcohol;

SURFONIC LF-17 (Texaco Chemical Co.) a nonionic surfactant which is an alkyl polyethoxylated ether;

PLURAFAC RA-30 (BASF Wyandotte Corp.) a nonionic surfactant which is a modified oxyethylated straight chain alcohol;

PLURAFAC D-25 (BASF Wyandotte Corp.) a nonionic surfactant which is a modified oxyethylated straight chain alcohol;

TRITON X-120 (Rohm & Haas Co.) a nonionic surfactant which is an octyl phenoxy polyethoxy ethanol;

GENAPOL PN-30 (American Hoechst Co.), a nonionic surfactant which is composed of ethylene diamine containing about 30 moles of ethylene oxide and about 60 moles of propylene oxide;

ETHOMEEN C/20 (Armak Co.), a nonionic surfactant which is a coconut oil amine containing about 10 moles of ethylene oxide;

ANTAROX BL 330 (GAF Corp.) a nonionic surfactant which is an alkyl poly (ethyleneoxy) ethanol;

TRITON CF-10 (Rohm & Haas Co.) a nonionic surfactant which is an alkylaryl polyether having a carbon chain of about 14 carbon atoms and approximately 16 moles of ethoxylation;

SURFACTANT AR 150 (Hercules, Inc.) a nonionic surfactant which is an ethoxylated abietic acid derivative with approximately 15 moles of ethoxylation;

PLURONIC L061 (BASF Wyandotte, Inc.) a nonionic surfactant which is a condensate containing only ethylene oxide and propylene oxide chains;

ANTAROX LF-330 (GAF Corp.) a nonionic surfactant which is an alkyl poly(ethyleneoxy) ethanol;

PEGOSPERSE 700-TO (Glyco Chemicals, Inc.) a nonionic surfactant which is an abietic acid ester containing approximately 14 to 16 moles of ethoxylation;

IGPAL CA-630 (GAF Corp.) a nonionic surfactant, which is an alkyl phenoxy poly(ethyleneoxy) ethanol;

TRYCOL LF-1 (Emery Industries, Inc.) a nonionic surfactant which is an alkyl poly ether;

RENEX 20 (I.C.I. United States, Inc.) a nonionic, polyoxyethylene ester of mixed fatty acids and resin acids;

MIRAWET B (Miranol Co.) an anionic surfactant, sodium 2-butoxyethoxyacetate;

SURFONIC LF-7 (Texaco Chemical Co.) a nonionic surfactant which is an alkyl polyethoxylated ether;

TERGITOL ANIONIC-08 (Union Carbide Corporation) an anionic surfactant which is sodium 2-ethyl hexyl sulfate;

PETRO ULF (Petrochemicals Co., Inc.)—Linear alkyl naphthalene-anionic; and

CHEMEEN C-12G (Chemex, Inc.) an ethoxylated coco amine.

HYAMINE 3500 (Rohm & Haas Co.) a cationic surfactant which is lauryl dimethyl benzyl ammonium chloride.

The surfactants serve to enhance the cleaning effect of the composition and facilitate the removal of shop dirt, lubricating and treating oils, marks from highlite marking pens, etc. Low foaming non-ionic surfactants are preferred.

The arylenetriazoles are compounds of the formula

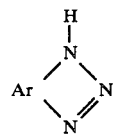

where Ar is o-phenylene, mono-alkyl-o-phenylene, polyalkyl-o-phenylene, o-naphthylene, and alkyl-o-naphthylene wherein the alkyl group has from 1 to 4 carbon atoms. The preferred compound is a 4-methyl-benzotriazole of the structure.

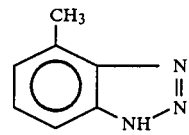

The triazoles act as inhibitors in preventing attack by the alkaline solution on the zinc in the galvanized steel.

If the composition will not be used within a few days after its preparation, but at later time, it is preferable to add a preservative to the composition to prevent microbial growth, e.g. sodium pyrithione which acts as both a fungicide and bacteriacide. It is added in a concentration in percent by weight of about 0.1 to about 1.0, preferably from about 0.2 to about 0.3%.

Additional ingredients which can be added to the present compositions include water soluble dyes to aid in identification, small amounts of fragrances, e.g. lemon oil, to mask or improve the odor, and alkali borates to improve the cleaning power. The alkali borate can be added per se, or as boric acid plus an alkali hydroxide, e.g. sodium or potassium hydroxide, in a concentration of about 3 to about 7% by weight.

The aqueous compositions of the invention can be formulated as such or, preferably, prepared as concentrates and then diluted with appropriate quantities of water prior to use. Useful concentrates can contain the above ingredients in the following approximate percent by weight:

| Ingredient | % by weight | Preferred % by weight |
|---|---|---|
| an alkanolamine | 10–30 | 13–17 |
| an aliphatic carboxylic acid containing 5 to 18 carbon atoms | 9–13 | 10–12 |
| an arylenetriazole | 0.1–0.35 | 0.15–0.25 |
| surfactant | 0–10 | 3–17 |
| water | qs. 100 | qs. 100 |

The above concentrates can be used without dilution or diluted with water, e.g. to a 20% concentration.

The invention will become clearer from the examples which follow. These examples are given by way of illustration and are not to be regarded as limiting.

In preparing the aqueous compositions of this invention the desired quantities of the materials comprising the compositions were dissolved with stirring in the required amount of water at room temperature. Alternatively, the compositions can be formed with less than the required amount of water, and after solution is complete, additional water is then added to bring the solution to the desired concentration.

In the examples, the numerical amounts refer to weight percent.

EXAMPLE 1

| | |
|---|---|
| Triethanolamine | 15.00 |
| Isononanoic acid | 11.00 |
| Tolyltriazole* | 0.20 |
| Water q.s. | 100.00 |

*a mixture of 4- and 5- methylbenzotriazole

While ordinary tap water is satisfactory, as a matter of practice deionized water was used.

EXAMPLE 2

| | |
|---|---|
| Triethanolamine | 15.00 |
| Isononanoic acid | 11.00 |
| CHEMEEN C-12G | 4.00 |
| Tolyltriazole | 0.20 |
| Water q.s. | 100.00 |

EXAMPLE 3

Same ingredients and quantities thereof as in Example 2 except that benzotriazole was used in place of tolyltriazole.

EXAMPLE 4

Same ingredients and quantities thereof as in Example 2 except that PETRO ULF was used in place of CHEMEEN C-12G.

EXAMPLE 5

| | |
|---|---|
| Triethanolamine | 15.00 |
| Isononanoic acid | 11.00 |
| CHEMEEN C-12G | 4.00 |
| Tolyltriazole | 0.20 |
| Sodium pyrithione | 0.20 |
| Water q.s. | 100.00 |

EXAMPLE 6

Same ingredients and quantities thereof as in Example 5 except that PETRO ULF was used in place of CHEMEEN C-12G.

EXAMPLE 7

Same ingredients and quantities thereof as in Example 5 except that MIRAWET B was used in place of CHEMEEN C-12G.

EXAMPLE 8

Same ingredients and quantities thereof as in Example 5 except that ETHOMEEN C20 was used in place of CHEMEEN C-12G.

EXAMPLE 9

| | |
|---|---|
| Triethanolamine | 15.00 |
| 4-Ethylhexanoic acid | 11.00 |
| CHEMEEN C-12G | 4.00 |
| Tolyltriazole | 0.20 |
| Sodium omadine | 0.20 |
| Water q.s. | 100.00 |

EXAMPLE 10

Same ingredients and quantities thereof as in Example 9 except that caprylic acid was used in place of 2-ethylhexanoic acid.

EXAMPLE 11

| | |
|---|---|
| Triethanolamine | 15.00 |
| Caproic acid | 11.00 |
| CHEMEEN C-12G | 4.00 |
| Tolyltriazole | 0.20 |
| Sodium pyrithione | 0.20 |
| Water q.s. | 100.00 |

EXAMPLE 12

| | |
|---|---|
| Triethanolamine | 15.00 |
| Valeric acid | 11.00 |
| CHEMEEN C-12G | 4.00 |
| Tolyltriazole | 0.20 |
| Sodium pyrithione | 0.20 |
| Water q.s. | 100.00 |

EXAMPLE 13

| | |
|---|---|
| Triethanolamine | 15.00 |
| Isononanoic acid | 11.00 |
| CHEMEEN C-12G | 3.50 |
| GENAPOL PN30 | 0.50 |
| Tolyltriazole | 0.20 |
| Water q.s. | 100.00 |

EXAMPLE 14

Same ingredients and quantities thereof as in Example 13 except that the composition contained 0.20% by weight of sodium pyrithione.

EXAMPLE 15

| | |
|---|---|
| Triethanolamine | 15.00 |
| Isononanoic acid | 11.00 |
| Potassium hydroxide | 4.00 |
| Boric acid | 5.00 |
| CHEMEEN C-12G | 3.50 |
| GENAPOL PN30 | 0.50 |
| Tolyltriazole | 0.20 |
| Sodium pyrithione | 0.20 |
| Water q.s. | 100.00 |

The compositions of the above examples were found to be effective in removing from metallic surfaces such resin-containing sealants as:

GM 998-1263, a polyvinyl chloride plastisol sealer manufactured by Union City Industries, Union City, Mich.;

GM 998-1553, a polyvinyl chloride plastisol sealer manufactured by Hughes Chemical Co., Madison Heights, Mich.;

GM 998-1301, a red sealer having a linseed oil base, manufactured by J. W. Mortell, Warren, Mich.;

M4G145C, a pink sealer used by the Ford Motor Company;

M4G161C, a white sealer used by the Ford Motor Company; and

GM 998-1981, a black sealer used by the General Motors Corporation;

which had been placed on the metal. The sealants were readily and effectively removed by contacting them with the composition, such as by wiping with a rag which had been dipped into the composition being tested. In addition to wiping, the sealant was also effectively removed by spraying the composition onto the metal or dipping the metal into the composition. The compositions can be used at full strength or in diluted form of about 2 to 5 fold dilution. The diluted compositions were substantially as effective as those at full strength.

When the metal from which the sealant was removed was galvanized steel, it was then treated as described above and a phosphate precoat applied. These phosphate precoats were not streaky and showed no spotting.

The compositions were also tested under field conditions in the factory on automobiles in which certain parts of the bodies were composed of galvanized steel. The sealant was readily removed by wiping or spraying leaving a clean surface, and the phosphate precoat which was subsequently applied as described above showed no streaking or spotting.

What is claimed is:

1. An aqueous alkaline composition which is effective in removing a resin-containing sealant from ferrous and zinc containing metals without adversely affecting the surfaces of the metal, containing as essential ingredients: an alkanolamine, an aliphatic carboxylic acid containing 5 to 18 carbon atoms, and an arylenetriazole having the formula

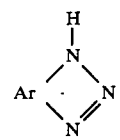

where Ar is o-phenylene, monoalkyl-o-phenylene, polyalkyl-o-phenylene, o-naphthylene and alkyl-o-naphthylene where the alkyl group has from 1 to 4 carbon atoms, wherein the alkanolamine and the aliphatic carboxylic acid are present in the composition in amounts sufficient to remove the resin-containing sealant when the aqueous composition is applied thereto and wherein the arylenetriazole is present in a quantity sufficient to prevent attack on the metal surfaces by the aqueous alkaline solution.

2. A composition according to claim 1 wherein the aliphatic carboxylic acid is an alkanoic acid which is straight chained or branched.

3. A composition according to claim 2 wherein the alkanoic acid is isononanoic acid.

4. A composition according to claim 3 wherein the arylenetriazole is tolylenetriazole.

5. A composition according to claim 1 which contains in approximate percent by weight:

| | |
|---|---|
| an alkanolamine | 1–55 |
| an aliphatic carboxylic acid containing 5 to 18 carbon atoms | 0.9–40 |
| an arylenetriazole | 0.01–1.0 |
| surfactant | 0–15 |
| water q.s. | 100. |

6. A composition according to claim 5 which contains in approximate percent by weight:

| | |
|---|---|
| an alkanolamine | 2–6 |
| an aliphatic carboxylic acid containing 5 to 18 carbon atoms | 1.5–3.0 |
| an arylenetriazole | 0.02–0.07 |
| surfactant | 0.3–5 |
| water q.s. | 100. |

7. A composition according to claim 5 which contains approximate percent by weight:

| | |
|---|---|
| an alkanolamine | 2.5–3.5 |
| an aliphatic carboxylic acid containing 5 to 18 carbon atoms | 2.0–2.5 |
| an arylenetriazole | 0.3–0.05 |
| Surfactant | 0.6–1.5 |
| Water q.s. | 100. |

8. A composition according to claim 5 wherein the aliphatic carboxylic acid is an alkanoic acid, the alkyl portion of which is straight chained or branched.

9. A composition according to claim 8 wherein the alkanoic acid is isononanoic acid.

10. A composition according to claim 9 wherein the arylenetriazole is selected from the group consisting of phenylenetriazole, tolyltriazole, dimethylbenzotriazole, and naphthylenetriazole.

11. A composition according to claim 10 wherein the arylenetriazole is tolyltriazole.

12. A composition according to claim 11 wherein the surfactant is anionic, cationic, nonionic, or a mixture of two or more of such surfactants, provided that the mixture does not include both cationic and anionic surfactants.

13. A composition according to claim 12 wherein the surfactant is nonionic.

14. A composition according to claim 13 which contains a preservative to prevent microbial growth.

15. A composition according to claim 14 wherein the preservative is present in from about 0.1 to about 1.0% by weight.

16. A composition according to claim 15 wherein the preservative is present in about 0.2 to about 0.3% by weight.

17. A composition according to claim 16 wherein the preservative is sodium pyrithione.

18. A composition according to claim 17 which contains a water-soluble dye.

19. A composition according to claim 18 which contains a fragrance.

20. A composition according to claim 17 which contains about 3 to 7% by weight of an alkali metal borate, the alkali metal being sodium or potassium.

21. An aqueous composition containing in approximate parts by weight:

| | |
|---|---|
| an alkanolamine | 10-30 |
| an aliphatic carboxylic acid containing 5 to 18 carbon atoms | 9-13 |
| an arylenetriazole | 0.1-0.35 |
| surfactant | 0-10 |
| water q.s. | 100. |

22. A composition according to claim 21 which contains approximate percent by weight:

| | |
|---|---|
| an alkanolamine | 13-17 |
| an aliphatic carboxylic acid containing 5 to 18 carbon atoms | 10-12 |
| An arylenetriazole | 0.15-0.25 |
| surfactant | 3-7 |
| water q.s. | 100. |

23. A process for removing a resin-containing sealant from the surface of a zinc containing metal which comprises contacting the sealant with the composition of claim 1.

24. A process according to claim 23 wherein the metal is galvanized steel.

25. A process according to claim 23 wherein the contacting is achieved by spraying, dipping or wiping.

* * * * *